United States Patent [19]

DiPasquale

[11] 4,352,865
[45] Oct. 5, 1982

[54] FUEL CELL MATRIX HAVING CURLING COMPENSATION

[75] Inventor: Renato DiPasquale, Toms River, N.J.

[73] Assignee: Energy Research Corporation, Danbury, Conn.

[21] Appl. No.: 288,521

[22] Filed: Jul. 30, 1981

[51] Int. Cl.³ .............................................. H01M 2/14
[52] U.S. Cl. ........................................ 429/41; 429/144
[58] Field of Search ................ 429/41, 144, 145, 105, 429/101, 192, 129, 44, 42

[56] References Cited

U.S. PATENT DOCUMENTS

| | | |
|---|---|---|
| 3,202,547 | 8/1965 | Rightmire et al. ..................... 429/41 |
| 3,481,737 | 12/1969 | Siebenberg et al. ................... 136/86 |
| 3,560,268 | 2/1971 | Winsel ................................... 429/90 |
| 3,575,718 | 4/1971 | Adlhart et al. ....................... 136/86 |
| 4,276,356 | 6/1981 | Baker ................................... 429/41 |

*Primary Examiner*—Donald L. Walton

[57] ABSTRACT

A fuel cell matrix comprising a first layer of material having opposing first and second surfaces and second and third layers of material each adjacent one of said opposing surfaces, the first and second layers having different dimensional expansion with electrolyte addition, whereby said layers tend to curl, and the third layer having dimensional expansion with electrolyte addition such as to counteract the curling of said first and second layers.

17 Claims, 2 Drawing Figures

FUEL CELL MATRIX HAVING CURLING COMPENSATION

BACKGROUND OF THE INVENTION

This invention pertains to fuel cells and, in particular, to multi-layer electrolyte carrying matrices for use in such cells.

It is known in the fuel cell art to utilize a matrix construction for carrying the fuel cell electrolyte. To be suitable for this purpose, the matrix must be stable in the electrolyte environment, must exhibit a desired degree of bubble pressure (i.e., must be a suitable gas barrier) and must exhibit high electrolytic conductivity and low electronic conductivity. To meet these requirements, attempts have been made to develop multi-layer matrix assemblies comprised of layers, each of which exhibits one or more desired properties.

U.S. Pat. No. 3,481,737 describes an early attempt at a multi-layer structure in which successive layers of amosite and fiberglass are utilized as a fuel cell matrix. In this case, the fiberglass layers exhibit good gas barrier and wicking properties, but are unstable in the fuel cell electrolyte. The amosite layers, on the other hand, exhibit good wicking and stability properties, but are poor gas barriers. The composite, described as preferably having amosite as the electrode contacting layers and illustrated as two such layers sandwiching a fiberglass layer, is thus alleged to have the good wicking properties of the separate layers, the good stability of the amosite layers and the good bubble pressure of the fiberglass layers. Matrices of this type were found to operate only for a limited time, i.e., for well under 100 hours.

Further attempts have been directed to realizing structures with a reduced number of layers, since increasing the number of layers increases the complexity of the structure as well as increases the electronic conductivity. In U.S. Pat. No. 3,575,718, a two layer matrix is disclosed in which one of the layers comprises carbon and the other layer is carbonless and comprises inert organic compounds. In this matrix structure, the carbon layer provides good gas barrier and electrolytic conductivity properties, while the carbonless layer affords a low electronic conductivity.

A further two layer matrix is described in copending commonly assigned U.S. application Ser. No. 24,416, filed Mar. 27, 1979 now U.S. Pat. No. 4,276,356. The matrix of this application comprises a first layer of silicon carbide and a second layer of carbon material. The latter layer provides the matrix with good gas barrier properties, while the former material affords the layer good electrolytic conductivity and low ionic conductivity.

While the aforesaid two layer matrix has demonstrated superior performance with respect to gas barrier and electronic and electrolytic conductivity properties, production of the composite matrix using customary techniques requires special care and is time-consumming. More specifically, when the matrix composite has been constructed, the addition of the electrolyte has been found to cause an undesirable curling or bending of the composite structure. The composite must therefore be restrained from curling during acid addition or, if allowed to curl, must be flattened, before disposition between the cell electrodes. As stated, this is a tedious and time-consumming process and undesirable where large scale production is desired.

It is therefore a primary object of the present invention to provide a multi-layer matrix which can be readily produced on a large scale.

It is a further object of the present invention to provide a multi-layer matrix which resists curling upon electrolyte addition.

SUMMARY OF THE INVENTION

In accordance with the principles of the present invention, the above and other objectives are realized in a matrix comprising a first layer having opposing first and second surfaces, a second layer situated adjacent the first surface of the first layer and expanding to a different degree than the first layer upon electrolyte addition, whereby bending or curling tends to occur, and a third layer disposed adjacent the second surface of the second layer and expanding upon electrolyte addition to a degree such as to substantially compensate for the bending or curling of the first and second layers. Preferably, the third layer expands to substantially the same degree and comprises the same material as the second layer. Further, preferably, the second and third layers are silicon carbide and the first layer is carbon, each layer further containing a binder material, such as, for example, polytetrafluoroethylene (PTFE).

Due to the third layer compensating for the curling or bending of the first and second layers, the composite matrix remains substantially flat upon electrolyte addition. As a result, electrolyte can be added without having to restrain the matrix and the matrix need not be flattened before disposition between the fuel cell electrodes.

BRIEF DESCRIPTION OF THE DRAWINGS

The above and other features and aspects of the present invention will become more apparent upon reading the following detailed description, in conjunction with the accompanying drawings, in which.

DETAILED DESCRIPTION

Figure 1:
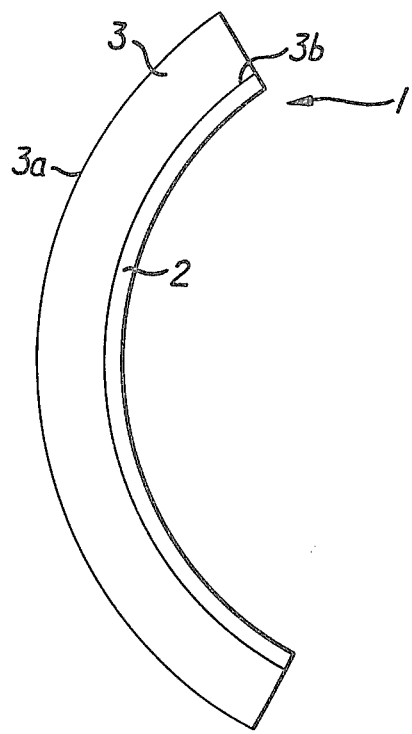
FIG. 1 shows a prior art multi-layer fuel cell matrix with electrolyte added.

FIG. 1 shows a matrix 1 comprising a first layer 3 having opposing surfaces 3a and 3b. A second layer 2 is disposed on the surface 3b of the first layer. In the present illustrative case, the first thicker layer 3 comprises a material which expands in dimension to a greater degree than the material of the second layer 2 upon the addition of an electrolyte (i.e., the linear rate of expansion of the first layer material is greater than the linear rate of expansion of second layer material with electrolyte addition). Thus, the first layer might comprise carbon with a suitable binder, such as, for example, PTFE, while the second layer might comprise silicon carbide with the same binder.

As can be seen, the addition of an electrolyte such as, for example, phosphoric acid causes curling or bending of the matrix in the direction of the lesser expanding layer, i.e., the layer 2, along the longest dimension of the matrix. This bending requires that the matrix be flatened upon disposition between the flat electrodes of its respective fuel cell. Alternatively, the matrix has to be constrained during acid addition and during subsequent disposition between the fuel cell electrodes. Either of these procedures necessitates extreme care and requires a long time and is, therefore, not ideally suited for mass production.

Figure 2:
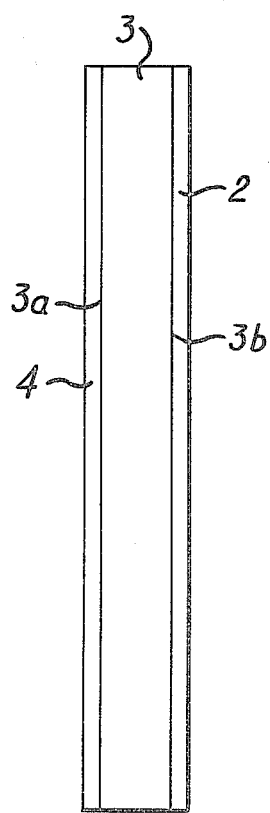
FIG. 2 illustrates a multi-layer fuel cell matrix in accordance with the principles of the present invention.

In accordance with the principles of the present invention, the matrix 1 is further modified, as shown in FIG. 2, by the addition thereto of a third layer 4 having expansion with electrolyte addition substantially similar to that of the layer 2. The layer 4 is disposed on the surface 3a of the layer 3 and upon addition of electrolyte cancels or compensates for the curling or bending of the matrix resulting from the layer 3, thereby causing the matrix 1 to remain substantially flat. No special attention must, therefore, be given to the matrix upon subsequent incorporation into the fuel cell.

The layer 3 preferably is formed from carbon having a particle size of approximately 500 Angstroms and a surface are greater than 100 square meters per gram. The concentration of PTFE may be from 1-10%, with a concentration of 3-6% being preferable. The layers 2 and 4, on the other hand, may be formed from silicon carbide of particle size 0.5 to 10 microns. The concentration of PTFE in these layers may also be from 1-10%, with a range of 4-6% being preferable. The overall thickness of the matrix, i.e., the three layers, may range from 0.005 to 0.040 inches, with a range of 0.008 to 0.012 inches being preferable. Individual thickness for the layer 3 may range from 0.002 inches to 0.0020 inches and for the layers 2 and 4 from 0.0005 inches to 0.010 inches.

It should be noted that the principles of the invention are applicable as well to the situation where the layer 3 expands to a lesser degree than the similar greater expanding layers 2 and 4. In such case, the layer 4 will likewise compensate for any bending or curling to result in a flat matrix 1 as described above.

A matrix in accordance with the present invention was constructed comprising as the layer 3 carbon containing PTFE and as the layers 2 and 4 silicon carbide containing PTFE. The thickness of the silicon carbide layers was 0.001 inches and that of the carbon layer 0.010 inches.

The above-described matrix was assembled in a nominal 5"×15" size fuel cell between an oxygen (air) electrode and a hydrogen electrode of the present state-of-the art types and filled with 100% $H_3PO_4$ electrolyte. The cell was then heated to 300° F. and with the introduction of hydrogen and oxygen (air) to the anode and cathode respectively an open circuit voltage of 0.97 volts was obtained. When an electrical load was applied across the fuel cell the following polarization data were obtained:

| Amperes I | Current Density ma/cm$^2$ | Cell Voltage Volts |
|---|---|---|
| 5 | 12.5 | 0.82 |
| 10 | 25 | 0.77 |
| 20 | 50 | 0.73 |
| 40 | 100 | 0.67 |
| 60 | 150 | 0.62 |

The cell was then operated continuously for a period of over 750 hours at an average voltage of 0.63 volts.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A fuel cell matrix for carrying an electrolyte comprising:
   a first layer having opposing first and second surfaces;
   second and third layers disposed adjacent said first and second surfaces, said first layer expanding to a different degree than said second layer upon the addition of said electrolyte, whereby said first and second layers tend to curl upon such electrolyte addition,
   and said third layer expanding upon electrolyte addition such as to substantially cancel said curling of said first and second layers.

2. A fuel cell in accordance with claim 1 in which:
   the degree of expansion of said second and third layers with electrolyte addition is substantially equal.

3. A fuel cell in accordance with claim 2 wherein:
   the dimensional expansion of said second and third layers is less than that of said first layer upon addition of electrolyte.

4. A matrix in accordance with claim 3 wherein:
   the linear rate of expansion of said second and third layers is less than that of said first layer upon addition of electrolyte.

5. A matrix in accordance with claim 3 wherein:
   said first layer comprises a carbon material;
   and said second and third layers comprise a silicon carbide material.

6. A matrix in accordance with claim 5 wherein:
   said first layer further comprises a binder material;
   and said second and third layers further comprise a binder material.

7. A matrix in accordance with claim 6 wherein:
   said binder material of said first layer is PTFE in an amount of 1-10 percent;
   and said binder material of said second and third layers is PTFE in an amount of 1-10 percent for each layer.

8. A matrix in accordance with claim 7 wherein:
   said binder material of said first layer is present in an amount of 3-6 percent;
   and said binder material of said second and third layers is present in an amount of 4-6 percent.

9. A matrix in accordance with claim 5 wherein:
   the thickness of said matrix is in a range of 0.005 to 0.040 inches.

10. A matrix in accordance with claim 9 wherein:
    the thickness of said matrix is in a range of 0.008 to 0.012 inches.

11. A matrix in accordance with claim 8 wherein:
    the thickness of said first layer is in a range of 0.002 inches to 0.020 inches;
    and the thickness of each of said second and third layers is in a range of 0.0005 inches to 0.010 inches.

12. A matrix in accordance with claim 4 wherein:
    the carbon material has a surface area greater than 100 m$^2$/g and a particle size less than 500 Angstroms;
    and the silicon carbide material has a particle size less than 10 microns.

13. A matrix in accordance with claim 2 wherein:
    said second and third layers have substantially equal thickness.

14. A matrix in accordance with claim 1 wherein:

the dimensional expansion of said first layer is less than that of said second and third layers upon electrolyte addition.

15. A matrix in accordance with claim 14 wherein: the linear rate of expansion of said first layer is less than that of said second and third layers upon addition of electrolyte.

16. A matrix in accordance with claim 1 further comprising:
an electrolyte therein.

17. A matrix in accordance with claim 16 wherein: said electrolyte is phosphoric acid.

* * * * *